Dec. 12, 1939.  R. H. GODDARD  2,183,312
FUEL STORAGE AND DISCHARGE APPARATUS
Original Filed Nov. 9, 1936
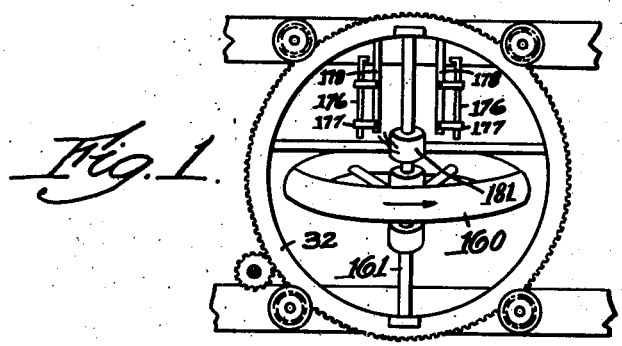
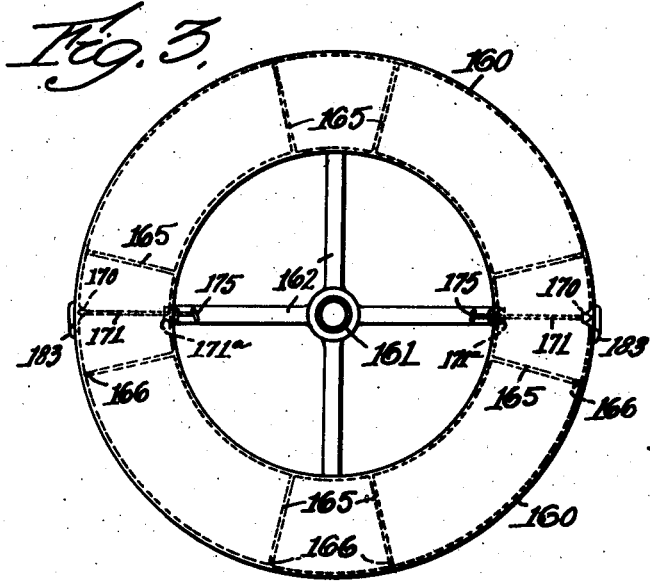
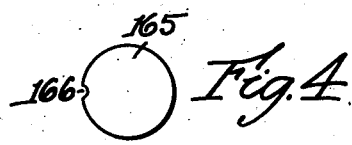
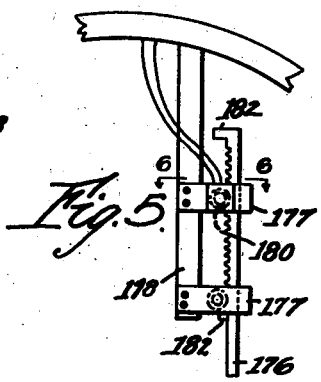
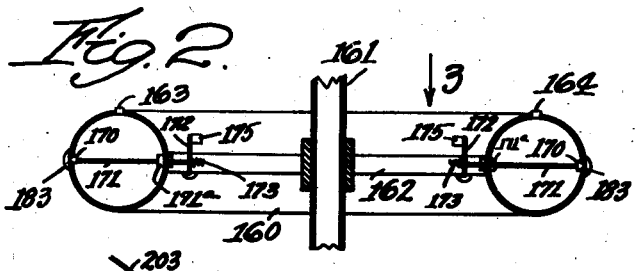
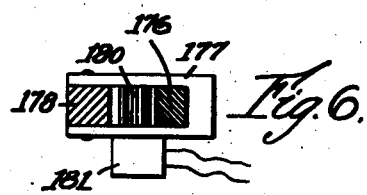
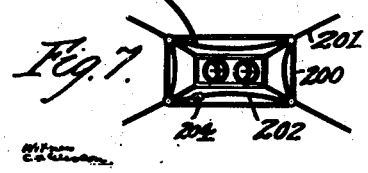
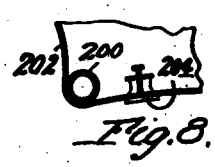
Inventor.
Robert H. Goddard
By attorney
Chas. T. Hawley Patented Dec. 12, 1939

2,183,312

UNITED STATES PATENT OFFICE 2,183,312

FUEL STORAGE AND DISCHARGE APPARATUS

Robert H. Goddard, Roswell, N. Mex.

Original application November 9, 1936, Serial No. 109,964. Divided and this application March 31, 1938, Serial No. 199,180

4 Claims. (Cl. 74—5)

This application is a division of my prior application Serial No. 109,964, filed November 9, 1936, on Gyroscopic steering apparatus, which has matured into Patent No. 2,158,180, dated May 16, 1939.

The present invention relates to certain fuel storage and discharge apparatus, fully shown and described in said original application.

The invention relates more specifically to the provision of hollow rotating gyroscope rings or rotors in the steering gyroscopes of an aircraft, which hollow rings may be filled with liquid fuel, to be used later in propelling the aircraft. This liquid fuel, when confined within one or more hollow gyroscope rings, provides the necessary mass for effective flight control. As the flight continues and the usual fuel supply tanks become exhausted, the fuel in the gyroscope rings may be gradually withdrawn for combustion purposes.

Although such loss of weight from the gyroscope rings will somewhat reduce their corrective action, this is not a serious disadvantage, since a large part of the weight of the craft is in the regular fuel load, and by the time the fuel tanks are nearly empty the weight of the craft will have been reduced sufficiently so that even the empty gyroscope rings will produce effective flight control.

A further feature of my invention relates to the provision of special means for withdrawing the liquid fuel from the rapidly rotating hollow gyroscope rings or rotors in such manner as to continuously maintain and even increase the angular momentum of the gyroscopes as the mass of the rotating elements is gradually decreased.

A preferred form of the invention is shown in the drawing, in which

Fig. 1 is a side elevation of a steering gyroscope embodying my improvements;

Fig. 2 is a sectional view of the rotating gyroscope ring or rotor;

Fig. 3 is a plan view, looking in the direction of the arrow 3 in Fig. 2;

Fig. 4 is a side elevation of a partition member used in the gyroscope construction shown in Figs. 2 and 3;

Fig. 5 is a side elevation of certain devices by which the discharge valves are controlled;

Fig. 6 is an enlarged sectional view, taken along the line 6—6 in Fig. 5;

Fig. 7 is a detail view to be described; and

Fig. 8 is an enlarged view of certain parts shown in Fig. 7.

Referring to Figs. 1, 2 and 3, each hollow rotating gyroscope element is preferably made in the form of a hollow ring or rotor 160 supported on a hollow shaft 161 by hollow spokes 162, all of which hollow elements preferably connect with each other. A filler plug 163 is provided at one point on the ring 160 and a counterbalance of equal weight is provided at 164.

Stiffening diaphragms 165 are provided at spaced intervals within the hollow ring 160, which partitions also serve to keep the liquid rotating at the same speed as the hollow ring. Each diaphragm has a notch or opening 166 (Fig. 4) at its outer edge to permit flow of liquid toward one or the other of two oppositely disposed discharge valves 170 (Fig. 2), shown herein as outwardly closing needle valves.

Each needle valve 170 has a rod 171 extending inward through the ring 160 and through a packing 171ª, said rod being connected to a pivoted lever 172 (Fig. 2). A compression spring 173 acts on each lever 172 and rod 171 to normally maintain its needle valve 170 in closed or outer position, which action is assisted by centrifugal force.

Each lever 172 has a cam plate 175 (Fig. 3) mounted thereon and angularly disposed in the path of a pair of valve-opening slides 176 (Fig. 5). The slides 176 are each mounted in guideways 177 secured to arms 178 (Fig. 1) extending inward from the gimbal 32 which supports the rotating gyroscope elements 160.

Each slide 176 is provided with rack teeth engaged by a pinion 180 (Figs. 5 and 6), which pinion may be rotated by a small motor 181, the operation of which may be either manual or float-controlled. Movement of the slides is limited by inner and outer stops 182 (Fig. 5).

The slides 176 are mounted in pairs so positioned that the two associated slides when moved toward the ring 160 will simultaneously engage the cam plates 175 at opposite sides of a ring, thus causing simultaneous momentary opening of both needle valves 170 twice during each revolution. Every time the valves are opened, a small amount of liquid is discharged through the valves 170 into rearwardly disposed caps or nozzles 183 (Figs. 2 and 3).

The caps or nozzles 183 direct the ejected fuel rearwardly relative to the tangential motion of the periphery of the hollow gyroscope element 160, so that the fuel leaves the gyroscope at much reduced peripheral speed. This causes repeated movements of the valve rods 171 toward the axis of the rotor and thereby effecting less splashing in the fuel tank to which the fuel is delivered, and furthermore the energy of the escaping fuel is largely transferred to the gyroscope ring and to the remaining fuel. This tends to speed up the gyroscope and thus maintain its momentum, offsetting to a considerable extent the reduction in mass of the gyroscope rotor as the fuel escapes therefrom. As equal amounts of fuel escape at opposite points on the gyroscope ring, no unbalanced force acting on the ring is caused by the escape of fuel.

In the construction shown in Fig. 7, a steering gyroscope unit is mounted in a box-like casing 200 secured within a fuel tank by light supports 201. The casing 200 is provided with a thin flexible liquid-tight covering 202, so disposed that all sides of the casing will be concave to withstand the hydrostatic pressure of the fuel in the tank.

A vent pipe 203 leads from the casing 200 to the hollow space at the top of the fuel tank above the fuel level. A vent valve 204 (Fig. 8) is provided in the side of the casing 200, which valve 204 is closed by outside hydrostatic pressure so long as the casing is submerged, but opens by gravity when the fuel level in the tank drops below the valve. If the fuel in the rotating gyroscope is then discharged, after the fuel level drops and when the valve 204 is open, the discharged fuel flows through the valve 204 to the fuel tank.

By thus utilizing the rotating elements of a gyroscope apparatus as fuel containers, these elements may be made of any desired size and when filled they will have sufficient mass to produce any desired angular momentum and flight-correcting effect.

Having thus described my invention and the advantages thereof, I do not wish to be limited to the details herein disclosed, otherwise than as set forth in the claims, but what I claim is:

1. In gyroscopic steering apparatus for aerial craft, that improvement which consists in providing a hollow annular gyroscope rotor, means to fill said rotor with liquid fuel, means to rotate said rotor at high speed, means to cause said liquid fuel to rotate with said rotor and at substantially the same speed, normally-closed means in the periphery of said motor effective when opened to gradually discharge said fuel from said rotor while said rotor is rotating at said high speed, and apparatus to render said discharge means intermittently and momentarily operative at least once in each revolution of said rotor.

2. In gyroscopic steering apparatus for aerial craft, that improvement which consists in providing a hollow annular gyroscope rotor, means to fill said rotor with liquid fuel, means to rotate said rotor at high speed, a pair of discharge valves in the periphery of said rotor and at opposite sides of said rotor, and means to open said valves simultaneously as said rotor is rotating at said high speed.

3. In gyroscopic steering apparatus for aerial craft, that improvement which consists in providing a hollow annular gyroscope rotor, means to fill said rotor with liquid fuel, means to rotate said rotor at high speed, a pair of discharge valves in the periphery of said rotor and at opposite sides of said rotor, means to open said valves simultaneously as said rotor is rotating at said high speed, and rearwardly opening caps covering said valves and effecting rearward discharge of fuel when said valves are opened.

4. In gyroscopic steering apparatus for aerial craft, that improvement which consists in providing a hollow annular gyroscope rotor, means to fill said rotor with liquid fuel, means to rotate said rotor at high speed, a pair of discharge valves in the periphery of said rotor and at opposite sides of said rotor, means to open said valves simultaneously as said rotor is rotating at said high speed, and a plurality of substantially radial partitions fixed within said hollow rotor and having openings therethrough adjacent the periphery of said ring, said partitions being effective to induce rotation of the contained liquid with said rotor.

ROBERT H. GODDARD.